United States Patent [19]
Motohashi

[11] 3,779,623
[45] Dec. 18, 1973

[54] SECTIONAL RACK

[75] Inventor: Masatoshi Motohashi, Osaka, Japan

[73] Assignee: Sekisui Kagaku Kogyo Kabushiki Kaisha, Osaka, Japan

[22] Filed: June 23, 1972

[21] Appl. No.: 265,884

[30] Foreign Application Priority Data
June 23, 1971  Japan..........................46/54741

[52] U.S. Cl.................. 312/257, 312/108, 312/111
[51] Int. Cl. ...................... A47b 43/00, A47b 87/00
[58] Field of Search.................... 312/108, 111, 257

[56] References Cited
UNITED STATES PATENTS
2,926,978  3/1960  Mitchell............................. 312/108
2,631,913  3/1953  Rosenberg....................... 312/257 R
1,186,634  6/1916  Weiss................................... 312/108
3,567,300  3/1971  Mari................................... 312/257
2,360,451  10/1944  Stone................................... 312/257

Primary Examiner—Paul R. Gilliam
Attorney—Richard C. Sughrue et al.

[57] ABSTRACT

Interfitting, similar sized and configured members, without bolts, screws, nuts or like locking members, define stacked or end to end coupled unit boxes to form a sectional rack useful as a display rack, filing cabinet or bookcase.

7 Claims, 8 Drawing Figures

PATENTED DEC 18 1973 3,779,623

SECTIONAL RACK

BACKGROUND OF THE INVENTION

1. Field of the Invention

This invention relates to a sectional rack, and more particularly, to the sectional rack assembled by fitting and connecting a plurality of unit boxes and plates with each other and suitable for use as a bookcase, a display rack and a filing cabinet, with each unit box composed of a plurality of segments.

2. Description of the Prior Art

Various types of conventional sectional racks already produced and sold are composed of several vertical pillars and a plurality of rigid panels attached between the pillars, or composed of mutually fitted panels. Others are composed of panel or pillar segments mutually connected by bolts, nuts, screws or like locking members.

SUMMARY OF THE INVENTION

The sectional rack of this invention has an improved structure different from such conventional types and can be built up without the use of locking means.

An object of this invention is to provide a novel sectional rack suited for mass production in a work shop, and capable of being assembled and dismantled easily without bolts, nuts, screws and like locking means, permitting the storing, shipping and selling of units as the "rack set."

Another object of this invention is to provide the sectional rack made of wooden members, metallic members, and preferably synthetic resin members.

Other objects will be clarified in the particular description of the invention, hereinafter.

BRIEF DESCRIPTION OF THE DRAWINGS

Now, the particular embodiments of this invention will be described with reference to accompanying drawings, wherein.

DESCRIPTION OF PREFERRED EMBODIMENTS

Figure 1:
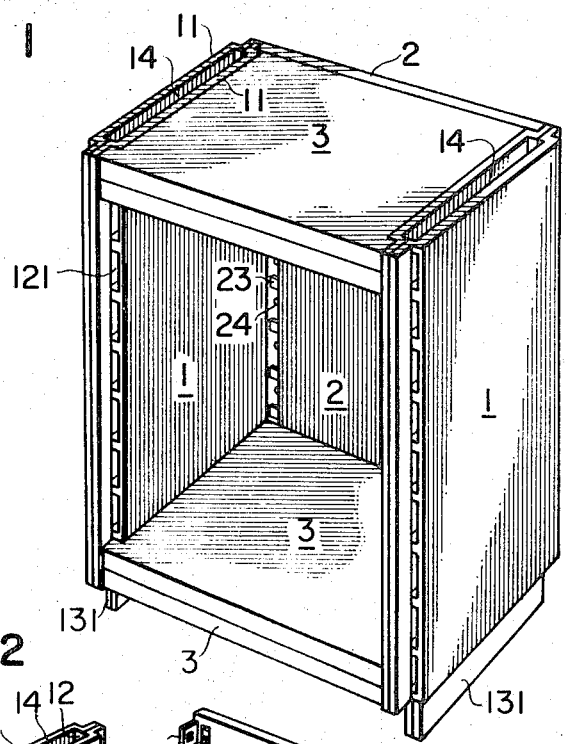
FIG. 1 is a perspective view of a box unit for the rack of this invention.

The sectional rack of this invention comprises a plurality of side wall units 1 and one or more laying plate units 3 which comprise a pair of plates 31, 32, put between the side wall units 1 and having projections 33 at both side rims for inserting into recesses in the side wall units 1. If necessary, a rear plate 2 having a plurality of projections 22 provided at both side rims for inserting into recesses in the side wall units 1 employed in which each side wall unit is assembled by a pair of mutually confronting side plates 11. A pair of slender plates 12 are placed between said side plates 11, and a bottom plate 13 to form an upper opening 14. A plurality of recesses 121 are provided in series within the slender plates 12 and a projection 131 is provided at the bottom plate 13 to be engaged with a given recess 14.

The side wall unit 1 is shaped as a thin box, and composed of confronting sidewalls in the form of a pair of wide plates 11, a pair of slender plates 12, connected between the wide plates 11 and a bottom plate 13. An opening 14 is formed on the upper face of the box shaped plate unit 1. A projection 131 is attached to the bottom plate 13 so as to engage with the opening 14 of the neighboring side wall unit 1, thus enabling one to assemble a plurality of said wall units with each other. A pair of ribs 122 project from the slender plate 12, and a series of fitting recesses 121 are provided at both sides of the ribs 122. The provision of these ribs 122 is not indispensable.

In an example of the side plate unit of this invention, the wide plates 11, the slender plates 12, the bottom plate 13 and the projection 131 can be formed in one piece. If necessary, this one piece plate unit may include the ribs 122.

In another example, the side wall unit is composed of a pair of like figured members.

Each member is composed of a wide plate 11 having a pair of end projections to form a pair of the slender plates 12, a plate to form the bottom plate 13, and a plate to form the projection 131. A pair of said members are coupled to each other to form the side wall unit. In a case where they are provided with vertical ribs 122, a plate to form the latter may be incorporated with the member.

In another example, the side wall unit may be assembled by plane members without ribs and projections on the rear surface.

Figure 5:
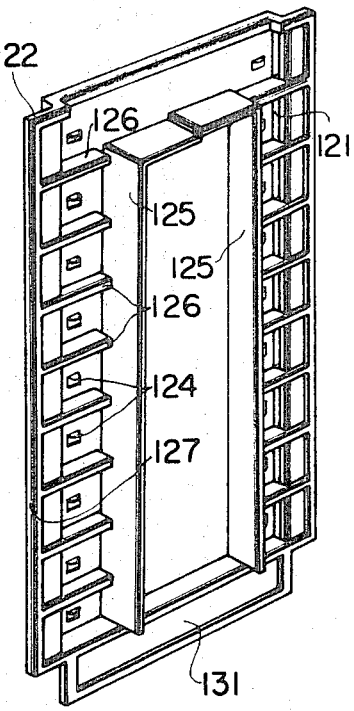
FIG. 5 is a perspective view of a side wall segment of a box unit.
Figure 6:
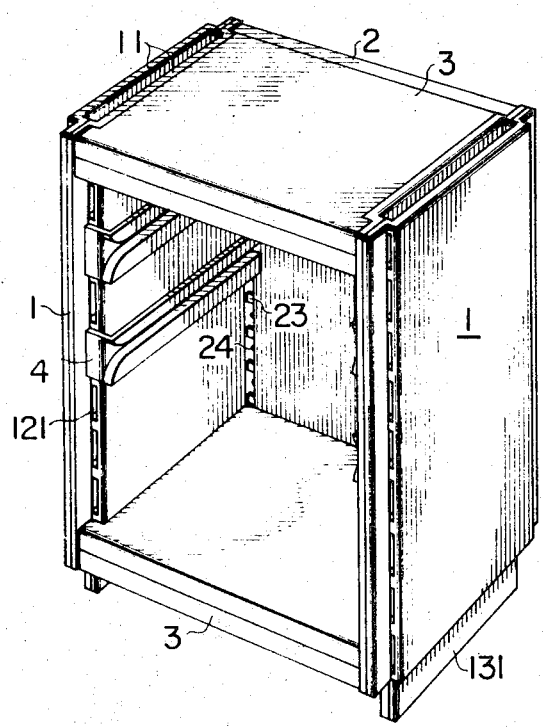
FIG. 6 is a perspective view of the box unit similar to that of FIG. 1, to which a drawer rail is attached.

On the contrary, a plate member having various ribs, projections and recesses may be used, as shown in FIG. 5. In FIG. 5, a pair of reinforcing vertical ribs 125 are provided on the rear face of the plate member of the side wall unit 1 in a regular interval. A series of lateral reinforcing ribs 126 are provided between the vertical rib 125 and a plate part to form the slender plate 12, thereby to strengthen the upper and lower zones of the fitting recesses 121 on the slender plate 12. The periphery of the rear face of this plate member is shaped as a thick rib 127 to reinforce the latter.

Small projections 124 may be provided near the fitting recesses 121 on the wide plate 11 to rigidly fix the laying plate 3 to the side wall unit.

A plurality of flukes or projections 22 are arranged in series at both vertical edges of the rear plate 2 so that each projection 22 erects on the plane part 21 of the rear plate 2. Each of these projections 22 is inserted into a corresponding fitting recess 121 of the side wall unit 1 to assemble the rack.

Figure 2:
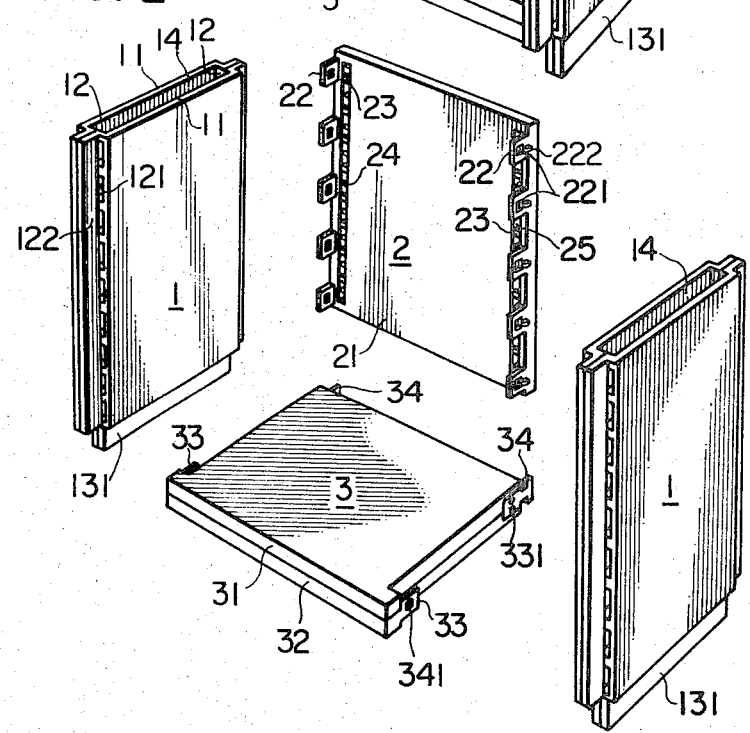
FIG. 2 is an exploded view of the box unit of FIG. 1.
Figure 3:
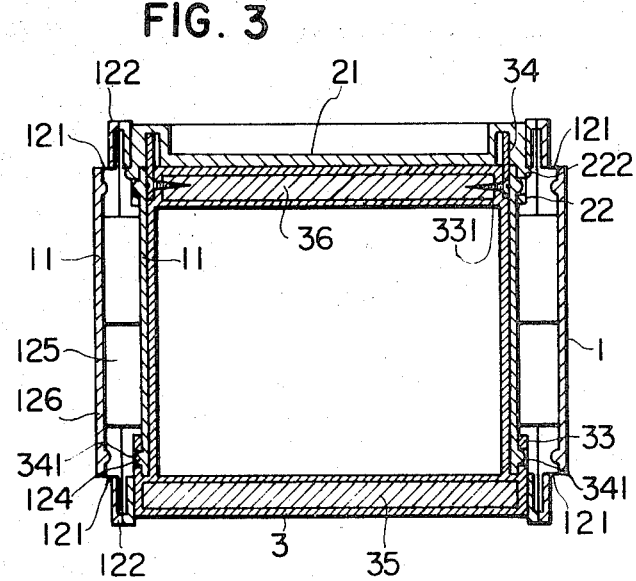
FIG. 3 is a cross section of the box unit shown in FIG. 1, along line III — III.
Figure 4:
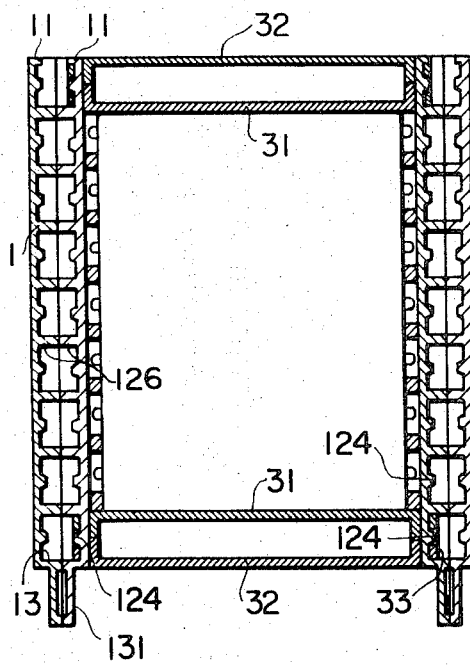
FIG. 4 is a cross section of the box unit shown in FIG. 1, along line IV — IV.

There are three features to projection 22: the first of which is; as a small plain plate, it is merely inserted into the recess 121; the second of which is that as a small plate it has a stopper hole 221 into which the small projection 124 in the sidewall is inserted, FIG. 2; the third of which is as a small plain plate or small plate having the stopper hole 221 and a small stopper projection 222 is provided near the foot of the small plate which abuts ribs 122 after insertion.

A plurality of recesses 25 are provided between neighboring projections 22 which are formed at both edges of the rear face 21 of the rear plate 2, FIG. 2, and a plurality of flukes 23 are formed in the recesses 25 to fix a pair of flukes 34 on the corners of the laying plate 3.

The laying plate 3 may be formed as a one piece plate, but preferably reinforcing members 35 are embedded between an upper layer 31 and a lower layer 32 to strengthen the laying plate. Plates of steel, light metal, wood or strong and tough synthetic resin may be used for the reinforcing members.

A pair of inserting projections 33 are provided at both sides of the laying plate 3 near the front corners, and a stopper hole 341 is formed in each said projection 33. As described above, a pair of flukes 34 are provided at both sides of the laying plate 3 near the rear corners to be engaged with the flukes 23 of the rear plate 2. Each said projection 33 is inserted into the recess 121 of the side wall unit 1 and fixed by engaging the flukes 34 with the flukes 23 in the recess 25 of the rear plate 2.

The projections 34 may be prepared separately from the laying plate unit 3 and attached to the latter by screws 331.

The desired numbers of laying plate units 3 may be used in accordance with the structure of the rack, while the number of the side wall units 1 and that of the rear plates 2 are so determined.

In order to assemble the side wall unit pair 1, the rear plate 2, and the laying plate 3 with each other into a box unit, a pair of the side wall units is first confronted with each other at a regular interval, and then the inserting projections 22 of the rear plate unit 2 are inserted into the recesses 121 on the slender plates 12 of side wall units 1, respectively.

In a case where the projections 22 have stopper holes 221, the laying plate 3 has preferably small projections 124 therein to engage the latter fixedly with the stopper holes 221. If the stopper projections 222 are provided on the inserting projections 22, the slip-off of the rear plate 2 from the side wall unit 1 can be prevented.

After that, a pair of projections 33 provided on both sides of the laying plate 3 near the front corners is inserted into the recesses 121 on the slender plates 12 of the side wall units 1, respectively, and simultaneously a pair of flukes 32 formed on the laying plate 3 near the rear corners are engaged with the flukes 23 of the rear plate 3 to thereby form the box unit.

This box unit can be used for a rack as it is, but may be further assembled with many other box units in vertical and lateral directions to obtain a complicated and large sized sectional rack. In order to connect a plurality of box units laterally with each other, a plurality of side walls 1 are first arranged at regular intervals, plurality of rear plate units 2 are padded to the side of each said side wall unit 1 and put between neighboring two side wall units by inserting the projections 22 into the recesses 121 on the side plates 12 of the side wall units 1, the laying plates 3 are successively put between the neighboring two side wall units 1 to insert the projections 33 of the laying plate unit 3 into the recesses 121 on the slender plates 12 of the side wall units 1, and simultaneously the flukes 32 in the laying plate 3 are engaged with the flukes 23 in the rear plate unit 3, thereby to form a series of connected boxes. Thus, box units, or a sectional rack can be obtained.

In order to pile up the box units in the vertical direction, a pair of projections 131 of the side wall units 1 are inserted into the upper openings or recesses 14 thus causing the sectional rack.

In both cases, all the rear plate units 2 are not always padded to the side wall unit 1.

Figure 7:
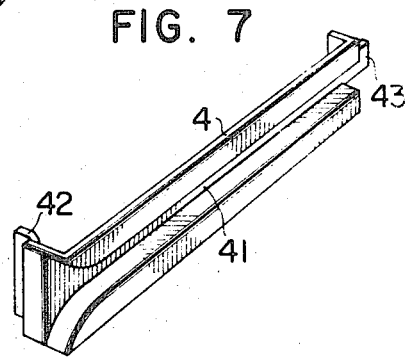
FIG. 7 is a perspective view of the drawer rail of FIG. 6.
Figure 8:
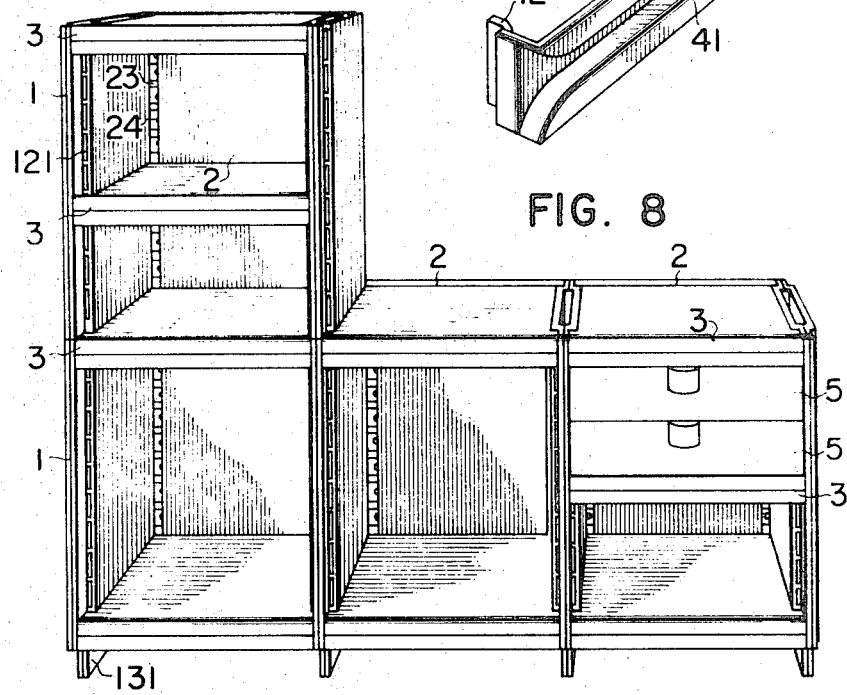
FIG. 8 is a perspective view of the rack of this invention.

If necessary, drawers 5 can be provided in the sectional rack by attaching therein guide rails 4 on which the drawers 5 run, as shown in FIG. 7.

A guide groove 41 is provided on the guide rail 4, and a stopper 42 is attached to one end of the guide rail while a projection 43 is provided at another end. The stopper 42 engages a recess 121 of the side wall unit 1, whereas the projection 43 is inserted between a fluke 23 and a small stopper projection 24 on the rear plate unit 2. As the guide rail 4 is flexible, it can be attached to the box unit in the bent state.

The assembled rack can be dismantled into parts by drawing off first the inserting projections 33 of the laying plate 3 from the recesses 121 of the side wall units 1 and then drawing off the inserting projections 22 of the rear plate unit 2 from the recesses 121.

As the box unit is composed of the like figured and sized members or units, such as the side wall 1, the rear plate 2 or the bottom plate 3, the sectional rack of this invention made by assembling a plurality of said box units and is suited for the mass production in the work shop. It is capable of easy dismantling without bolts, nuts, screws or like locking members permitting storing, sipping selling as the "rack set." This sectional rack is suitable for a bookcase, a display rack and a filing cabinet.

While this invention has been described with reference to particular embodiments thereof, it will be understood that the numerous modifications may be made by those skilled in the art without actually departing from the scope of the invention.

Therefore, the appended claims are intended to cover all such equivalent variations as coming within the true spirit and scope of the invention.

What is claimed is:

1. A sectional rack comprising:
   a plurality of vertically stackable, interfitting side wall units 1, each side wall unit comprising spaced parallel side walls having mutually confronting laterally offset side and bottom edges forming front and rear ribs (122), a bottom projection (131) and a slot (14) at the top thereof,
   a series of spaced projection receiving recesses (121) within each side wall unit 1 adjacent one side of each rib (122) at said offset, and
   at least one laying plate unit (3) being substantially T-shaped in plan configuration having projections (33) fixed to the wide edges and laterally offset from the narrow edges, extending from the front edge rearwardly, parallel to the narrow edges thereof and insertable within respective recesses (121) of said side wall units 1 on each side thereof to couple the laying plate unit (3) to said wall units (1).

2. The sectional rack as described in claim 1, further comprising: a rear plate unit 2 having a plurality of vertically spaced projections (22) provided along both sides and inserted into corresponding projection receiving recesses 121 of respective side wall units 1 at the rear thereof.

3. A sectional rack comprising at least one box unit, said box unit comprising:
   a pair of side wall units 1, each of said side wall units 1 being vertically stackable and interfitting with other side wall units 1 of other box units, each side wall unit 1 comprising:
spaced parallel side walls having mutually confronting laterally offset side and bottom edges forming front and rear ribs 122,
a bottom projection 131, and
an open top slot 14,
a series of spaced projection receiving recesses (121) within each side wall unit 1 adjacent one side of each rib (122) at said offset,
a laying plate unit (3) for each box unit,
said laying plate unit (3) having laterally offset projections (33) extending rearwardly from the front edge thereof, parallel to the side edges thereof, and inserted within respective projection receiving recesses (121) of said side wall unit 1 on each side thereof,
each box unit further comprising a rear plate unit (2),
said rear plate unit (2) having a plurality of projections (22) provided along both sides at vertically spaced positions and inserted into corresponding projection receiving recesses (121) of the side wall units (1) at the rear thereof.

4. The sectional rack as described in claim 3, further comprising: a pair of mutually parallel and vertical reinforcing ribs (125) attached to the rear face of each side wall member (1), a plurality of lateral ribs (126) provided between said vertical ribs (125) and the wall faces above and below the recesses 122 of the plate parts forming the rib (12), and a projecting rib (127) on the edge of the side wall member 1.

5. The sectional rack as claimed in claim 3, wherein a plurality of vertically spaced recesses (25) are provided within the rear plate unit (2), laterally offset from said rear plate projections (22) at vertically spaced positions along both side edges of said rear plate unit (2), and said laying plate (3) is provided with rearwardly directed projections (34) from both side edges thereof and received within said laterally offset recesses (25) of said rear plate unit (2) to further secure said laying plate (3) to said rear plate unit (2).

6. The sectional rack as claimed in claim 5, wherein the vertically spaced projections (22) of said rear plate unit (2) are each provided with a stopper hole (221), and each side wall unit 1 includes a corresponding projection (124) which is received therein when said rear plate projections (22) are insertably received within the recesses (121) of respective side wall units (1).

7. The sectional rack as claimed in claim 5, wherein the laterally offset projections (33) of said laying plate unit (3) carry recesses (341) therein and each side wall unit includes corresponding projections (124) carried thereby which are received within said laterally offset projection recesses (341) when said laterally offset projections (33) of said laying plate (3) are inserted within respective projection receiving recesses (121) of each side wall unit (1).

* * * * *